United States Patent
Hammon et al.

(10) Patent No.: US 12,447,417 B2
(45) Date of Patent: Oct. 21, 2025

(54) COLUMN FOR THERMAL TREATMENT OF A MIXTURE OF COMPOUNDS HAVING A TENDENCY TO POLYMERIZATION

(71) Applicant: BASF SE, Ludwigshafen am Rhein (DE)

(72) Inventors: Ulrich Hammon, Ludwigshafen am Rhein (DE); Lukas Schulz, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 210 days.

(21) Appl. No.: 18/284,313

(22) PCT Filed: Mar. 17, 2022

(86) PCT No.: PCT/EP2022/057036
§ 371 (c)(1),
(2) Date: Sep. 27, 2023

(87) PCT Pub. No.: WO2022/207349
PCT Pub. Date: Oct. 6, 2022

(65) Prior Publication Data
US 2024/0157269 A1  May 16, 2024

(30) Foreign Application Priority Data
Mar. 31, 2021 (EP) .................................... 21166189

(51) Int. Cl.
*B01D 3/32* (2006.01)
(52) U.S. Cl.
CPC .................................. *B01D 3/328* (2013.01)

(58) Field of Classification Search
CPC ................................ B01D 3/324; B01D 3/328
(Continued)

(56) References Cited

U.S. PATENT DOCUMENTS

| 1,808,088 A | 6/1931 | Urquhart |
| 3,988,213 A | 10/1976 | Yoshida et al. |

(Continued)

FOREIGN PATENT DOCUMENTS

| DE | 216633 A1 | 12/1984 |
| DE | 279822 A1 | 6/1990 |

(Continued)

OTHER PUBLICATIONS

International Search Report and Written Opinion received for PCT Patent Application No. PCT/EP2022/057036, mailed on Jul. 12, 2022, 12 pages.

*Primary Examiner* — Charles S Bushey
(74) *Attorney, Agent, or Firm* — Faegre Drinker Biddle & Reath LLP

(57) ABSTRACT

The present invention related to a column for the thermal treatment of a mixture of compounds having a tendency to polymerization, as well as a thermal separating process using the column. The column includes a mass transfer tray having a rising tube with an inlet opening below the tray and an outlet opening above the tray. The rising tube further includes a lateral opening above and close to the upper surface of the mass transfer tray. The rising tube forms a fountain spray of atomized liquid from the mixture of compounds above the tray that enter the rising tube through the lateral opening. The fountain is sprayed to a spot of the inner surface of the column where polymerization is likely to occur.

15 Claims, 3 Drawing Sheets

(58) Field of Classification Search
USPC .......................................... 261/114.1, 114.5
See application file for complete search history.

(56) References Cited

U.S. PATENT DOCUMENTS

| | | | |
|---|---|---|---|
| 5,739,391 | A | 4/1998 | Ruppel et al. |
| 5,821,390 | A | 10/1998 | Ruppel et al. |
| 6,294,056 | B1 * | 9/2001 | Matsumoto ............. C07C 51/44 |
| | | | 261/114.5 |
| 6,371,454 | B1 | 4/2002 | Gerla et al. |
| 6,755,943 | B1 | 6/2004 | Mizutani et al. |
| 8,191,870 | B2 | 6/2012 | Nieuwoudt et al. |
| 2001/0025122 | A1 | 9/2001 | Hirao et al. |
| 2003/0019737 | A1 | 1/2003 | Matsumoto et al. |
| 2004/0249198 | A1 | 12/2004 | Thiel et al. |
| 2005/0005418 | A1 | 1/2005 | Hammon et al. |
| 2005/0211542 | A1 | 9/2005 | Hammon et al. |
| 2006/0214317 | A1 | 9/2006 | Hieringer et al. |
| 2017/0014730 | A1 | 1/2017 | Hammon et al. |

FOREIGN PATENT DOCUMENTS

| | | |
|---|---|---|
| DE | 19740252 A1 | 3/1999 |
| DE | 19740253 A1 | 3/1999 |
| DE | 19924532 A1 | 11/2000 |
| DE | 19924533 A1 | 11/2000 |
| DE | 10156988 A1 | 5/2003 |
| DE | 10159823 A1 | 6/2003 |
| DE | 10218419 A1 | 6/2003 |
| DE | 10257915 A1 | 10/2003 |
| DE | 10230219 A1 | 1/2004 |
| DE | 10336386 A1 | 3/2004 |
| DE | 10243625 A1 | 4/2004 |
| DE | 10332758 A1 | 5/2004 |
| DE | 102010001228 A1 | 2/2011 |
| DE | 102015213493 A1 * | 9/2016 |
| EP | 0700714 A1 | 3/1996 |
| EP | 0700893 A1 | 3/1996 |
| EP | 0882481 A1 | 12/1998 |
| EP | 0982287 A1 | 3/2000 |
| EP | 0982289 A2 | 3/2000 |
| EP | 1029573 A2 | 8/2000 |
| EP | 1125912 A2 | 8/2001 |
| EP | 1279429 A1 | 1/2003 |
| EP | 1704906 A1 | 9/2006 |
| WO | 2004/035514 A1 | 4/2004 |
| WO | 2008/090190 A1 | 7/2008 |
| WO | 2017/012855 A1 | 1/2017 |

* cited by examiner

COLUMN FOR THERMAL TREATMENT OF A MIXTURE OF COMPOUNDS HAVING A TENDENCY TO POLYMERIZATION

CROSS-REFERENCE TO RELATED APPLICATIONS

This application is a National stage application (under 35 U.S.C. § 371) of PCT/EP2022/057036, filed Mar. 17, 2022, which claims benefit of European Application No. 21166189.7, filed Mar. 31, 2021, both of which are incorporated herein by reference in their entirety.

The present invention relates to a column for a thermal treatment of a mixture of compounds having a tendency to polymerization, wherein the column comprises a cylindrical, vertical column body which forms a column cavity, at least one mass transfer tray which is disposed in the column cavity and comprises at least one opening which is surrounded by a rim of the mass transfer tray. Furthermore, the present invention relates to a thermal separating process that uses such column.

In separating columns, ascending gas and descending liquid streams are in many cases conducted in countercurrent, at least one of the streams especially comprising a (meth)acrylic monomer. As a result of the inequilibria that exist between the streams, heat and mass transfer takes place, which ultimately causes the removal or separation desired in the separating column. In this document, such separating processes shall be referred to as thermal separating processes.

Examples of, and hence elements of, the expression "thermal separating processes" used in this document are fractional condensation (cf., for example, DE 19924532 A1, DE 10243625 A1 and WO 2008/090190 A1) and rectification (in both cases, an ascending gas phase is conducted in countercurrent to a descending liquid phase; the separating action is based on the gas composition at equilibrium being different from the liquid composition), absorption (at least one ascending gas is conducted in countercurrent to at least one descending liquid; the separating action is based on the different solubility of the gas constituents in the liquid) and desorption (the reverse process of absorption; the gas dissolved in the liquid phase is removed by lowering the partial pressure; if the partial pressure of the material dissolved in the liquid phase is lowered at least partly by passing a carrier gas through the liquid phase, this thermal separating process is also referred to as stripping; alternatively or additionally (simultaneously as a combination), the lowering of the partial pressure can also be brought about by lowering the working pressure).

For example, the removal of (meth)acrylic acid and/or (meth)acrolein from the product gas mixture of the catalytic gas phase oxidation can be conducted in such a way that the (meth)acrylic acid and/or the (meth)acrolein is first subjected to basic removal by absorption into a solvent (e.g. water or an organic solvent) or by fractional condensation of the product gas mixture, and the absorbate or condensate obtained is subsequently separated further to obtain (meth) acrylic acid and/or (meth)acrolein of greater or lesser purity (cf., for example, DE 10332758 A1, DE 10243625 A1, WO 2008/090190 A1, DE 10336386 A1, DE 19924532 A1, DE 19924533 A1, DE 102010001228 A1, WO 2004/035514 A1, EP 1125912 A2, EP 982289 A2, EP 982287 A1 and DE 10218419 A1).

The notation "(meth)acrylic monomers" in this document is an abbreviated form of "acrylic monomers and/or methacrylic monomers".

The term "acrylic monomers" in this document is an abbreviated form of "acrolein, acrylic acid and/or esters of acrylic acid".

The term "methacrylic monomers" in this document is an abbreviated form of "methacrolein, methacrylic acid and/or esters of methacrylic acid".

In particular, the (meth)acrylic monomers addressed in this document shall comprise the following (meth)acrylic esters: hydroxyethyl acrylate, hydroxyethyl methacrylate, hydroxypropyl acrylate, hydroxypropyl methacrylate, glycidyl acrylate, glycidyl methacrylate, methyl acrylate, methyl methacrylate, n-butyl acrylate, isobutyl acrylate, isobutyl methacrylate, n-butyl methacrylate, tert-butyl acrylate, tert-butyl methacrylate, ethyl acrylate, ethyl methacrylate, 2-ethylhexyl acrylate, 2-ethylhexyl methacrylate, N,N-dimethylaminoethyl acrylate and N,N-dimethylaminoethyl methacrylate.

(Meth)acrylic monomers are important starting compounds for preparation of polymers which find use, for example, as adhesives or as water-superabsorbing materials in hygiene articles.

On industrial scale, (meth)acrolein and (meth)acrylic acid are prepared predominantly by catalytic gas phase oxidation of suitable $C_3/C_4$ precursor compounds (or of precursor compounds thereof). In the case of acrolein and acrylic acid, such precursor compounds used are preferably propene and propane. In the case of methacrylic acid and of methacrolein, isobutene and isobutane are preferred precursor compounds.

As well as propene, propane, isobutene and isobutane, however, suitable starting materials are also other compounds comprising 3 or 4 carbon atoms, for example isobutanol, n-propanol or precursor compounds thereof, for example the methyl ether of isobutanol. Acrylic acid can also be obtained by oxidation of acrolein under gas phase catalysis. Methacrylic acid can also be obtained by oxidation of methacrolein under gas phase catalysis.

In the context of such preparation processes, it is normal to obtain product gas mixtures from which the (meth)acrylic acid and/or the (meth)acrolein have to be removed.

Esters of (meth)acrylic acid are obtainable, for example, by direct reaction of (meth)acrylic acid and/or (meth)acrolein with the appropriate alcohols. However, in this case too, product mixtures are at first obtained, from which the (meth)acrylic esters have to be removed.

The separating columns in which these separating processes are conducted comprise separating internals. In the thermal separating processes, these have the purpose of increasing the surface area for the heat and mass transfer which brings about the separation in the separating column ("the transfer area").

Useful internals of this kind include, for example, structured packings, random packings and/or trays, which are also referred to as mass transfer trays. Frequently, separating columns used are those which comprise at least one sequence of mass transfer trays as a portion of the separating internals.

The purpose of mass transfer trays is to provide areas having essentially continuous liquid phases in the separating column in the form of liquid layers that form thereon. The surface of the gas stream which ascends within the liquid layer and is distributed in the liquid phase is then the crucial transfer area.

A sequence of mass transfer trays is understood to mean a sequence (a succession) of at least two mass transfer trays generally of the same design (i.e. identical), arranged one above another in the separating column. Advantageously for application purposes, the clear distance between two immediately successive mass transfer trays in such a series (sequence) of mass transfer trays is uniform (meaning that the mass transfer trays are arranged equidistantly one above another in the separating column).

The simplest embodiment of a mass transfer tray is called a trickle sieve tray. This comprises a plate, or plate segments joined to form a plate, having essentially planar passage orifices, for example round holes and/or slots, for the ascending gas phase distributed over the plate (cf., for example, DE 10230219 A1, EP 1279429 A1, U.S. Pat. No. 3,988,213 and EP 1029573 A1). Any orifices beyond these (for example at least one downcomer (at least one drain segment)) are generally not present in trickle sieve trays. As a result of this absence of downcomers, both the gas ascending within the separating column (the gas ascending within the separating column) and the liquid descending within the separating column have to move, flowing in opposite directions, alternating in time, through the (same) passage orifices (through the open cross sections of the passages). Reference is also made to the "dual flow" of ascending gas and descending liquid through the passage orifices, which is the reason why the literature frequently also uses the term "dual-flow trays" for mass transfer trays of this type.

The cross section of the passage orifices of a dual-flow tray is matched in a manner known per se to the load thereon. If the cross section is too small, the ascending gas passes through the passage orifices at such a high velocity that the liquid descending within the separating column is entrained essentially without separating action. If the cross section of the passage orifices is too great, ascending gas and descending liquid move past one another essentially without exchange, and the mass transfer tray is at risk of running dry.

In other words, the separation-active working range of a trickle sieve tray (dual-flow tray) has two limits. There has to be a minimum limiting velocity of the ascending gas, in order that a certain liquid layer is held on the trickle sieve tray, in order to enable separation-active working of the trickle sieve tray. The upper limit in the velocity of the ascending gas is fixed by the flood point, when the gas velocity leads to backup of the liquid on the trickle sieve tray and prevents it from trickling through.

The longest dimension of the passage orifices of an industrial dual-flow tray (=longest direct line connecting two points on the outline of the passage orifice cross section) is typically 10 to 80 mm (cf., for example, DE 10156988 A1). Normally, the passage orifices are identical within a trickle sieve tray (in other words, they all have the same geometric shape and the same cross section (the same cross-sectional area)). Appropriately in application terms, the cross-sectional areas are circles. In other words, preferred passage orifices of trickle sieve trays are circular holes. The relative arrangement of the passage orifices of a trickle sieve tray advantageously follows a strict triangular pitch (cf., for example, DE 10230219 A1). It is of course also possible for the passage orifices to be configured differently within one and the same trickle sieve tray (to vary over the trickle sieve tray).

Advantageously in application terms, a sequence of trickle sieve trays comprises trickle sieve trays of the same design (identical trickle sieve trays) in a separating column, preferably arranged equidistantly one above another.

According to DE 10156988 A1, it is also possible to employ sequences of trickle sieve trays in separating columns having a uniform (preferably circular) cross section within a dual-flow tray, but varying within the sequence (for example decreasing from the bottom upward).

In general, each dual-flow tray in a corresponding tray sequence concludes flush with the wall of the separating column. However, there are also embodiments in which an intermediate space interrupted only partly by bridges exists between the column wall and tray. Aside from the actual passage orifices, a trickle sieve tray typically has, at most, orifices which serve to secure the tray on support rings or the like (cf., for example, DE 10159823 A1).

Within the normal working range of a sequence of trickle sieve trays, the liquid descending within the separating column trickles downward in droplets from dual-flow tray to dual-flow tray, meaning that the gas phase ascending between the dual-flow trays is permeated by a divided liquid phase. Some of the droplets that hit the lower trickle sieve tray in each case are atomized. The gas stream flowing through the passage orifices bubbles through the liquid layer formed on the surface of the tray, with intense heat and mass transfer between the liquid and the gas.

According to the gas and liquid load, there is a tendency in trickle sieve trays, in the case of column diameters of >2 m, for slightly unequal distributions of liquids to build up, and thus for the liquid hold-up of a tray to vary over a large area or for a circulating wave to form, which can firstly adversely affect the mechanical stability of the column body and secondly reduces the separating action, since the liquid distribution under these conditions is then time-dependent and highly location-dependent. To avoid such non-steady states, it has therefore been found to be advantageous to distribute baffles in the form of vertical metal sheets over the tray cross section, which prevent or at least greatly reduce buildup of liquid within the column body. The height of the metal sheets should correspond approximately to the height of the liquid froth layer that forms. This is typically about 20 cm at customary loads.

The cross section of a separating column is generally circular. This applies correspondingly to the accompanying mass transfer trays.

Dual-flow trays usable for the purposes of this document are described, for example, in Technische Fortschrittsberichte [Technical Progress Reports], vol. 61, Grundlagen der Dimensionierung von Kolonnenböden [Fundamentals of the Dimensioning of Column Trays], pages 198 to 211, Verlag Theodor Steinkopf, Dresden (1967), and in DE 10230219 A1.

The above-described sequence of trickle sieve trays which comprises mass transfer trays without forced flow of the liquid descending onto the tray on the tray is distinguished from sequences of mass transfer trays with such forced liquid flow.

It is a characteristic feature of these mass transfer trays that they additionally have, as well as the passage orifices already described, at least one downcomer. This is at least one downflow orifice present in the mass transfer tray, toward which the liquid which has descended onto the mass transfer tray (for example over an outlet weir (in the simplest embodiment, this may be an upward extension of the downflow orifice with a neck (a chimney; in the case of a circular downflow orifice, a tube))) flows, and which runs into a shaft which feeds the mass transfer tray below in the sequence and which is generally configured with central symmetry with respect to an axis pointing in the longitudinal direction of the column. The cross section of the shaft may vary (for example narrow) along this axis or else be constant.

By virtue of the at least one downcomer of the mass transfer tray, within a sequence of such mass transfer trays, the liquid descending from a higher mass transfer tray can descend independently of the gas which continues to rise through the passage orifices of this mass transfer tray as at least one feed of liquid to the next lowest mass transfer tray of the sequence.

The essential basis for this separation of the flow paths of descending liquid and ascending gas is the hydraulic seal (the liquid seal or else shaft seal) of the respective downcomer for the ascending gas (a downcomer must not form a bypass past the passage orifices for the ascending gas; the gas stream must not ascend past the passage orifices through a downcomer).

Such a hydraulic seal can be achieved, for example, by drawing the downcomer downward (allowing it to run downward) to such an extent that it is immersed deeply enough into the liquid layer on the next lowest mass transfer tray of the sequence (such a seal is also referred to in this document as "static seal"). The liquid level needed for this purpose can be achieved on the lower mass transfer tray, for example, through the height of appropriate outlet weirs.

However, such a design has the disadvantage that the area of the lower mass transfer tray directly below the outflow cross section of a downcomer of the mass transfer tray above (called the feed area) cannot have any passage orifices for the ascending gas and so is not available for heat and mass transfer between the liquid layer formed on the lower mass transfer tray and the ascending gas.

In an alternative embodiment, the lower outflow end of the downcomer is truncated to such an extent that it is no longer immersed into the liquid layer present on the mass transfer tray below. In this case, between the lower end of the at least one downcomer and the mass transfer tray onto which the downcomer runs, a sufficiently large intermediate space remains, in which a froth layer forms and heat and mass transfer can take place between a liquid layer which accumulates (on the lower mass transfer tray) and a gas ascending (through this tray). In other words, in this case, the "feed area" of the at least one downcomer on the mass transfer tray below may also have passage orifices and can thus increase the available exchange area of the mass transfer tray, and hence the separating action thereof.

A static liquid seal of the downcomer can be brought about in this case, for example, with the aid of a collecting cup mounted below the outflow end of the downcomer. Appropriately in application terms, in this case, the outer wall of the collecting cup is truncated to such an extent that the outflow end of the downcomer is immersed into the collecting cup (it is also possible to allow the lower edge of the downcomer to end at the upper edge of the collecting cup). In the course of operation of the column, the liquid flowing downward through the downcomer collects in the collecting cup until it flows over the upper edge of the outer wall of the collecting cup. The lower edge of the downcomer is immersed into the liquid present in the collecting cup, and the collecting cup forms a siphon-like liquid seal of the downcomer.

Alternatively, a truncated downcomer can also be sealed dynamically. For this purpose, the downcomer can be sealed, for example, at the lower end thereof with a tray provided with exit orifices of such dimensions that the liquid is backed up in the downcomer and prevents the penetration of gas (cf., for example, EP 0882481 A1 and DE 10257915 A1). The shaft seal is established in this case dynamically through the pressure drop which arises at the exit orifices. In other words, in the case of static sealing, the downcomer is sealed by virtue of the outflow end thereof being immersed into backed-up liquid, and, in the case of dynamic sealing, construction features at the outflow end of the downcomer have the effect that the exiting liquid suffers a pressure drop which brings about backup of the liquid descending in the downcomer, which causes the seal. In the simplest case, such a pressure drop can be caused by virtue of a small cross section of the exit orifice of the downcomer being selected compared to the mean cross section of the shaft.

For separation-active operation of a sequence of such mass transfer trays, the design of the at least one downcomer is relevant. Firstly, the cross section of the at least one downcomer selected must be sufficiently large (in general, the corresponding cross-sectional area is greater than the cross-sectional area of a passage orifice), in order that the liquid, even at maximum loading of the separating column, can still descend reliably through the at least one downcomer therewith, and does not back up on the tray above. On the other hand, it has to be ensured that, even in the case of minimal liquid loading, the hydraulic seal of the at least one downcomer still exists.

At a low gas loading, there is likewise the risk of liquid trickling through the passage orifices. In addition, the liquid has to be able to back up in a downcomer to such an extent that the weight of the backed-up liquid column is sufficient to convey the liquid into the gas space below the mass transfer tray to which the downcomer is connected. This backup height determines the required minimum length of the downcomer and thus partly determines the tray separation required in a sequence of corresponding mass transfer trays. A significant partial determining factor for the above backup height (backup length) is the pressure drop Op of a mass transfer tray. This pressure drop is suffered by the ascending gas as it flows through the passage orifices, and the "hydrostatic" head of the froth layer on the mass transfer tray. It is responsible for the fact that the pressure in the gas phase of a sequence of such mass transfer trays increases from the top downward. For the "hydrostatic" pressure hp of the liquid backed up in the downcomer of a mass transfer tray, it is therefore necessary for at least the condition hp>Δp of the mass transfer tray to be met. These connections are also known to the person skilled in the art, for example, from EP 1704906 A1, as is the possibility of ensuring that, with an inflow weir on the lower mass transfer tray, in the case of static sealing of the downcomer of the upper mass transfer tray in the liquid layer on the lower mass transfer tray, the shaft seal still exists even in the case of low loading with descending liquid. However, the use of an inflow weir increases the backup height required in the downcomer to force the liquid backed up therein onto the lower mass transfer tray. Overall, the element of the downcomer enables a broadening of the separation-active working range compared to the trickle sieve tray. A favorable outflow velocity of the liquid backed up in the downcomer from the downcomer in the process according to the invention is, for example, 1.2 m/s.

In addition, it enables forced circulation of the liquid descending onto a mass transfer tray on this tray.

If, for example, only half of a (preferably circular) mass transfer tray has at least one downcomer (which means that all downflow orifices are present with their full extent within the corresponding circle segment), and, in a sequence of at least two identical mass transfer trays of this kind, the mass transfer trays in a separating column are arranged one on top of another such that two mass transfer trays in the separating column, one of which follows the other in the downward direction, are each mounted offset (turned) by 180° relative to one another about the longitudinal axis of the column, such that the downcomers thereof are on opposite sides (in opposite halves) of the separating column, the liquid which descends from an upper mass transfer tray through the at least one downcomer thereof to the mass transfer tray mounted below must necessarily (i.e. of necessity) flow on this lower mass transfer tray, viewed over the lower mass transfer tray, from the at least one feed area of the at least one downcomer of the upper mass transfer tray (mounted above) (from the at least one feed through the at least one downcomer of the upper mass transfer tray) to the at least one downcomer of this lower mass transfer tray. In other words, the liquid descending from the upper to the lower tray is inevitably conducted across the tray from the at least one feed to the at least one outlet.

Such a liquid flow on a mass transfer tray within a sequence of identical mass transfer trays shall be referred to in this document as a crossflow, the sequence of such identical mass transfer trays as a sequence of identical crossflow mass transfer trays, and the individual mass transfer trays within the sequence as crossflow mass transfer trays.

In the simplest case, the crossflow mass transfer tray is a crossflow sieve tray. Apart from the at least one downcomer, it has passage orifices for the gas ascending in a separating column, and useful embodiments for the configuration thereof are in principle all of those addressed for the trickle sieve tray. A crossflow sieve tray preferably likewise has circular holes as passage orifices, and these likewise, advantageously for application purposes, have a uniform radius. As already mentioned, the at least one downcomer enables the liquid descending in a separating column, in a sequence of crossflow sieve trays, irrespective of the flow path of the gas ascending in the sequence, to descend (through the passage orifices) from a higher crossflow sieve tray to the next lowest crossflow sieve tray. On the lower tray, the liquid flows in crosscurrent from the at least one feed of the lower tray, which is formed by the at least one outlet of the higher crossflow sieve tray, to the at least one downcomer (to the at least one outlet) of the lower tray, the desired liquid height on the lower crossflow sieve tray being partly ensured, for example, by the height of at least one outlet weir over which the liquid can flow to the at least one downcomer. In addition, the liquid is retained on the crossflow sieve tray by the backup pressure of the gas ascending in the separating column. If the gas loading of a crossflow sieve tray, however, falls below a minimum value, the result may be trickling of the liquid through the passage orifices, which reduces the separating action of the crossflow sieve tray and/or leads to the crossflow sieve tray running dry.

This risk of running dry can be counteracted by providing the downflow orifice of the at least one downcomer with an outlet weir and extending the respective passage orifice in the upward direction with a neck (a chimney; in the case of a circular passage orifice, a tube).

Normally, gas-deflecting hoods (bubble caps, inverted cups) are mounted over the end of the neck (these may in the simplest case be placed on with screw connections to the neck, for example at the front and back, and are effectively pulled over the neck), which are immersed into the liquid backed up on the tray. The gas ascending through the respective passage orifice at first flows through the neck thereof into the accompanying hood, in which it is deflected, in order then, in contrast to the crossflow sieve tray, to flow in parallel to the tray surface from the hood into the liquid backed up thereon (such a "parallel outflow" is generally favorable in processes according to the invention in that it is able to "blow away" undesirably formed polymer particles and thus to bring about a self-cleaning effect). The gas streams exiting from adjacent hoods, preferably distributed equidistantly over the trays, agitate the liquid backed up on the tray and form a froth layer therein, in which the heat and mass transfer takes place. Such crossflow mass transfer trays are also referred to as crossflow bubble-cap trays or crossflow hood trays. Since they have backed-up liquid even in the case of low loading with ascending gas and thus are at no risk of running dry, they are also referred to as hydraulically sealed crossflow trays. Compared to crossflow sieve trays, they typically require higher capital costs and cause higher pressure drops of the gas ascending through them. The passage orifice of these trays designed (configured) as described is also referred to as bubble-cap passage orifice or hood passage orifice, in contrast to the simple sieve passage orifice of a sieve tray.

The most important component of the crossflow bubble-cap tray is the bubble cap (cf., for example, DE 10243625 A1 and Chemie-Ing. Techn. Volume 45, 1973/No. 9+10, pages 617 to 620). According to the configuration and arrangement of the bubble caps (gas deflecting hoods), crossflow bubble-cap trays are divided, for example, into crossflow round bubble-cap trays (the cross sections of passage orifice, chimney (neck) and bubble cap (gas deflecting hood) are round (for example the cylinder bubble-cap tray or the flat bubble-cap tray)), tunnel crossflow trays (the cross sections of passage orifice, chimney and bubble cap (hood) are rectangular; the passages with their bubble caps are arranged one after another within rows arranged alongside one another, with the longer rectangular edge aligned parallel to the crossflow direction of the liquid) and crossflow Thormann® trays (the cross sections of passage orifice, chimney and bubble cap (hood) are rectangular; the passages with their bubble caps are arranged one after another within rows arranged alongside one another, with the longer rectangular edge aligned at right angles to the crossflow direction of the liquid). Crossflow Thormann trays are described, for example, in DE 19924532 A1 and in DE 10243625 A1, and the prior art acknowledged in these two documents.

The bubble-cap edge in crossflow bubble-cap trays may have very different forms (cf. DE 10243625 A1 and Chemie-Ing. Techn. Volume 45, 1973/No. 9+10, pages 617 to 620). FIG. 3 from Chemie-Ing. Techn. Volume 45, 1973/No. 9+10, pages 618 shows some examples of the serrated and slotted edge. The serrations and slots are typically shaped such that the gas emerging from the bubble cap into the liquid backed up on the mass transfer tray dissolves very easily into a large number of bubbles or gas jets. The above FIG. 3 and various figures in DE 10243625 A1 also show illustrative embodiments of bubble-cap edges having a saw tooth-like structure, the teeth of which are additionally equipped with guide fins (guide surfaces; "slots bent open"). The guide fins are intended to impose a tangential exit direction on the gas stream exiting from the saw tooth-like slots bent open (direct the gas exit into the liquid in an oblique direction), as a result of which the surrounding liquid receives a directed movement pulse which, in cooperation with the arrangement of the bubble caps (gas deflecting hoods), can lead to a directed liquid flow on the crossflow bubble-cap tray, which is superimposed on the crossflow which is established, viewed over the mass transfer tray (frequently, such slots bent open are also referred to as forcing slots). For example, in a sequence of crossflow Thormann trays, the liquid on a lower crossflow Thormann tray does not flow directly across the tray, but rather, in the manner described above, is driven in a meandering manner from the at least one feed to the at least one outlet. The space between two hoods of a crossflow Thormann tray arranged one after the other in crossflow direction forms a channel in each case, in which the liquid flows. The detailed configuration of a crossflow Thormann tray is additionally normally in such a manner that the liquid flows in countercurrent in two channels which are successive in each case in crossflow direction (cf., for example, FIG. 3 of DE 10243625 A1). The meandering crossflow which results in this manner prolongs the flow path of the liquid from the at least one feed to the at least one outlet, which promotes the separating action of a crossflow Thormann tray.

As already stated, in a crossflow bubble-cap tray, the gas emerging from the bubble cap, in contrast to the crossflow sieve tray, is introduced parallel to the tray surface into the liquid backed up on the crossflow bubble cap tray. Frictional and buoyancy forces ensure that, with increasing distance of the emerging gas stream from the bubble-cap edge, more and more sub-streams thereof are deflected in a direction at right angles to the crossflow bubble-cap tray and ultimately escape from the liquid layer. With increasing gas loading of a bubble cap, the velocity of the gas stream emerging from it grows, which increases the distance from the edge of the bubble cap ("the effective range of the bubble cap") up to which the above-described deflection occurs.

This dependence of the effective range of a rigid bubble cap on the gas loading can be counteracted by configuring (designing) the passage orifice of a crossflow mass transfer tray as a valve (as a valve passage orifice). The resulting crossflow mass transfer trays are referred to as crossflow valve trays (cf., for example, DD 279822 A1, DD 216633 A1 and DE 102010001228 A1).

The term "crossflow valve trays" in this document thus covers crossflow mass transfer trays which have passage orifices (tray holes) with limited-stroke plate, ballast or lifting valves (floating flaps) which adjust the size of the gas passage orifice to the respective column loading.

In a simple configuration, the passage orifices of the tray are covered for the aforementioned purpose with covers or plates (disks) movable in the upward direction. In the course of passage of the ascending gas, the lids (plates, disks) are raised by the gas stream in a corresponding guide structure (guide cage) additionally mounted over the respective passage orifice (which is normally firmly anchored on the tray) and finally reach a stroke height corresponding to the gas loading (instead of a guide cage, the disk may also possess upwardly movable valve legs anchored to the tray, the upward mobility of which has an upper limit). The gas stream ascending through the passage orifice is deflected at the underside of the raised lid (plate, disk) in a similar manner to that in the bubble cap (in the case of a bubble-cap passage orifice) and exits from the exit region formed under the raised plate (lid, disk) and, as is the case for the bubble-cap tray, enters the liquid backed up on the tray parallel thereto. The plate stroke thus controls the size of the gas exit region and automatically adjusts to the column loading until the upper end of the guide cage limits the maximum possible stroke height. The plates may have spacers directed downward, such that, at low gas loading, the valve closes only to such an extent that the space provided by the spacers still permits vigorous mixing of the horizontal gas outflow with the crossflowing liquid. Spacers also counteract sticking of the valve disk on the tray. Through suitable configuration of the valve elements of a crossflow valve tray, the blowing direction of the valve element can be adjusted, and hence the forced liquid flow on the crossflow valve tray can additionally be influenced (cf., for example, DD 216633 A1). The principle of crossflow valve trays, and valve trays usable for the purposes of the present document, can be found, for example, in Technische Fortschrittsberichte, volume 61, Grundlagen der Dimensionierung von Kolonnenböden, pages 96 to 138. As well as the above-described moving valves, the person skilled in the art is also aware of fixed valves. These are normally disk-shaped, or trapezoidal, or rectangular units which are punched out of the tray plate and are connected thereto via fixed legs directed upward.

Especially in the case of relatively large diameters of a separating column, on crossflow mass transfer trays, a notable liquid gradient naturally forms proceeding from the at least one feed until attainment of the outlet weir of the at least one outlet (the gradient of the backup height of the liquid feeds the crossflow (to a limited degree)). The result of this is that, in regions with a relatively low liquid height, due to the resulting lower resistances, the ascending gas can pass through the liquid layer more easily in comparative terms. This can ultimately give rise to an inhomogeneous gas loading of the crossflow mass transfer tray (there is preferential flow through the regions with a lower liquid height (a lower flow resistance)), which impairs the separating action thereof. A compensating effect is possible in this respect through the use of, for example, bubble caps of adjustable height (alternatively, the bubble-cap size can also be altered) in the case of crossflow bubble-cap trays, or by use of, for example, plates (lids) with different weight in the case of crossflow valve trays, such that the mass transfer tray produces gas essentially homogeneously over its cross section (where the liquid height on the crossflow mass transfer tray is lower, the height of the bubble cap is, appropriately in application terms, selected at a correspondingly lower level, or the weight of the stroke plate (stroke lid) is selected at a correspondingly higher level; the height of the bubble cap can, for example, also be lowered by controlled shortening of the length of the corresponding chimney, at the end of which the bubble cap is optionally screwed on; alternatively or additionally, for example, the serration/slot structure of the bubble-cap edge can also be varied in order to bring about the desired flow resistance compensation; ideally, the adjustment is made over the crossflow mass transfer tray such that, in operation of the separating column, every bubble cap present on a crossflow bubble-cap tray causes the same flow resistance for the ascending gas). Otherwise, the passages (the passage orifices) of a crossflow mass transfer tray are generally advantageously configured uniformly.

Orifices running (from the top downward) through a crossflow mass transfer tray, the cross-sectional area of which is typically more than 200 times smaller than the overall cross-sectional area of all other orifices of the crossflow mass transfer tray (not including the cross section of the at least one downcomer), do not constitute (separating) passage orifices for the gas ascending through the crossflow mass transfer tray and are therefore not counted as part thereof. For example, such orifices may be tiny emptying holes through which hydraulically sealed crossflow trays can empty when a separating column is shut down. It is also possible for such orifices to serve for screw connection purposes.

Sequences of mass transfer trays having at least one downcomer, in which the at least one feed and the at least one outlet are present, for example, in the same half of the (circular) mass transfer tray, or in which the at least one feed is in the middle of the tray and the at least one outlet is at the edge of the tray, do not constitute a sequence of crossflow mass transfer trays in the sense of the application (of the invention).

The efficacy of crossflow mass transfer trays designed as described is typically less than that of one theoretical plate (one theoretical separation stage). A theoretical plate (or theoretical separation stage) shall be understood in this document quite generally to mean that spatial unit of a separating column which comprises separating internals and is used for a thermal separating process which brings about enrichment of a substance in accordance with the thermodynamic equilibrium. In other words, the term "theoretical plate" is applicable both to separating columns with mass transfer trays and to separating columns with structured packings and/or random packings.

The prior art recommends the use of sequences of at least two identical crossflow mass transfer trays, in separating columns including those comprising separating internals, which are employed for performance of thermal separating process between at least one gas stream ascending in the separating column and at least one liquid stream descending in the separating column, and wherein at least one of the streams comprises at least one (meth)acrylic monomer. For example, documents DE 19924532 A1, DE 10243625 A1 and WO 2008/090190 A1 recommend the additional use of a sequence of identical hydraulically sealed crossflow mass transfer trays in a separating column for performance of a process for fractional condensation of a product gas mixture comprising acrylic acid from a heterogeneously catalyzed gas phase partial oxidation of $C_3$ precursors of acrylic acid with molecular oxygen, which comprises, from the bottom upward, at first dual-flow trays and subsequently hydraulically sealed crossflow mass transfer trays.

A characteristic feature of the sequences of crossflow mass transfer trays recommended in the prior art is that the lower of two successive crossflow mass transfer trays in the sequence in each case, in the direction of crossflow from the at least one feed thereof to the at least one downcomer thereof, has passage orifices only in the region between the at least one feed and the at least one downcomer (the at least one downflow orifice; cf., for example, FIGS. 3 and 4 of DE 10243625 A1, FIG. 1 of DD 279822 A1, FIG. 1 of DD 216633 A1, and FIG. 1 from Chemie-Ing.-Techn. Volume 45, 1973/No. 9+10, pages 617 to 620).

A problematic property of (meth)acrylic monomers is the tendency thereof to unwanted polymerization, which cannot completely be suppressed even by the addition of polymerization inhibitors, particularly in the liquid phase.

A disadvantage of known separating columns is that, in the case of continuous performance of the thermal separating process, there is comparatively frequently formation of unwanted polymer over prolonged periods of operation in the mass transfer trays. This is particularly disadvantageous because the operator of the thermal separating process, due to the unwanted polymer formation, has to interrupt the thermal separating process time and again in order to remove the polymer formed. This is because the latter can partly or completely block the passage orifices of the mass transfer tray. Moreover, the free-radical polymerization of (meth)acrylic monomers is normally markedly exothermic, i.e. has high evolution of heat. There is the risk of polymerization proceeding so violently that the separating column comprising the polymerization mixture explodes.

WO 2017/012855 A1 relates to a column for thermal treatment of fluid mixtures, having a cylindrical, vertical column body which forms a column cavity, a plurality of trays mounted in the column cavity and spaced apart vertically from one another, at least one stub disposed within the column body and extending away from the column body, and a closable inspection orifice formed in the stub, wherein a spray device disposed in the column body can spray liquid at least against the surface of the stub directed into the column cavity. Further, a thermal separating process between at least one gas ascending within the column and at least one liquid descending within the column is disclosed. For example, in the case that the gas and/or the liquid contains (meth)acryl monomers, the tendency to polymerization in such column is particularly great. Such unwanted polymerization is prevented in said process by virtue of the spray device disposed in the column body which can spray liquid at least against the surface of the stub directed into the column cavity. Such processes have the disadvantage that they are accompanied by high investment costs and also cause increased costs for energy and maintenance during regular process mode.

It is therefore an object of the present invention to provide a column of the type as described above in a way that a simpler column is obtained which requires less constructional effort, less maintenance and is less cost sensitive during process mode. It is a further object of the present invention to provide a thermal separating process of the type as described above in a way that a simpler process is obtained which causes less maintenance and is less cost sensitive during process mode.

The spatial terms "top", "bottom", "horizontal" and "vertical" relate, unless explicitly stated otherwise, to the orientation of the column during operation.

Accordingly, the invention relates to a column for a thermal treatment of a mixture of compounds having a tendency to polymerization, wherein the column comprises a cylindrical, vertical column body which forms a column cavity, at least one mass transfer tray which is disposed in the column cavity and comprises at least one opening which is surrounded by a rim of the mass transfer tray. The column is characterized in that the mass transfer tray comprises at least one rising tube which is connected to the rim of the mass transfer tray in a gas-tight manner and which comprises an inlet opening which is located at or below the at least one mass transfer tray, and an outlet opening which is located above the at least one mass transfer tray. The rising tube further comprises at least one lateral opening which is located above the mass transfer tray in a vertical direction close to the upper surface of the mass transfer tray. Said rising tube is adapted to form a fountain by atomization of a liquid fraction of the mixture of compounds from the mass transfer tray that enters through at least one lateral opening into the rising tube by a rise of a gas phase of the mixture of compounds flowing from the inlet opening through the rising tube to the outlet opening where the fountain is sprayed into a part of the column located above the mass transfer tray to a spot of the inner surface of the column where polymerization is likely to occur.

The inventive column comprises a cylindrical, vertical column body which forms a column cavity. It is suitable for thermal treatment of a mixture of compounds having a tendency to polymerization. Said thermal treatment process is performed inside the column cavity.

The inventive column comprises at least one mass transfer tray which is disposed in the column cavity. Suitably, the column comprises more than one mass transfer tray, i.e. a sequence of mass transfer trays. For example, such mass transfer trays may be selected from mass transfer trays without forced flow such as trickle sieve trays and dual-flow trays, and mass transfer trays with forced liquid flow such as crossflow mass transfer trays, crossflow bubble-cap trays, crossflow hood trays, crossflow Thormann trays and crossflow valve trays.

In the event that the column comprises a sequence of mass transfer trays, the clear distance between two immediately successive trays may suitably be not more than 700 mm, preferably not more than 600 mm or not more than 500 mm. Appropriately in application terms, the clear distance within the tray sequence is 300 to 500 mm. In general, the tray separation should not be less than 250 mm.

In general, further separating internals may be disposed between the trays. Such separating internals improve the mass separation in the separating column. For example, these further internals may be provided in the form of packings such as structured or ordered packings, and/or beds of random packings. Among the random packings, preference is given to those comprising rings such as Raschig rings, Intos rings or Pall rings; helices; saddles such as Berl saddles or Intalox saddles etc. Structured packings, such as perforated structured packings made from stainless steel sheets are known per se to those skilled in the art.

The at least one mass transfer tray of the inventive column comprises at least one opening. In the context of the present application, the term "opening" refers to at least one inserted open passage in the mass transfer tray other than passage orifices such as tray holes which may, additionally, be present in the mass transfer tray. Suitably, such openings may have a circular, square, rectangular, etc. cross section. Preferably, the opening is circular, e.g. a circular hole.

The at least one opening of the at least one mass transfer tray of the inventive column is surrounded by a rim of the mass transfer tray. In the context of the present application, the term "rim of the mass transfer tray" refers to the closed perimeter of a geometric surface in the mass transfer tray, the geometric surface being the opening and the closed perimeter enclosing said opening. For example, in the event of the opening being a circular hole, the rim of the mass transfer tray is a circumference in the mass transfer tray which encloses said circular hole.

The at least one mass transfer tray of the inventive column comprises at least one rising tube. In the context of the present application, the term "rising tube" refers to a hollow tube, designed in such a way that a liquid phase and/or gas phase may flow through said hollow tube in an ascending, i.e. rising, manner. The rising tube is connected to the rim of the mass transfer tray in a gas-tight manner. Suitably, the rising tube may be welded to the rim of the mass transfer. Suitably, the rising tube may have a circular, square, rectangular, etc. cross section. The opening and the rising tube have the same cross section geometry, e.g. the opening may be a circular hole and the rising tube may be a cylindrical tube. In this case, the diameter of the opening may be in a similar range, or in particular equal, to the inner diameter of the rising tube.

In general, the mass transfer tray may comprise more than one rising tube.

The rising tube of the inventive column comprises an inlet opening. In the context of the present application, the term "inlet opening" refers to the part of the rising tube, where the liquid phase and/or gas phase may enter the rising tube before flowing through the rising tube. The inlet opening is located at or below the at least one mass transfer tray.

The rising tube of the inventive column comprises an outlet opening. In the context of the present application, the term "outlet opening" refers to the part of the rising tube, where the liquid phase and/or gas phase may exit the rising tube after flowing through the rising tube. The outlet opening is located above the at least one mass transfer tray, i.e., the outlet opening is also located above the inlet opening.

The rising tube of the inventive column comprises a lateral opening. In the context of the present application, the term "lateral opening" refers to at least one inserted open passage in the rising tube. Suitably, the at least one lateral opening may be a hole having a circular, square, rectangular, etc. cross section. Preferably, the opening is a circular hole. The lateral opening is located above the mass transfer tray in a vertical direction close to the upper surface of the mass transfer tray. For example, the lateral opening may be a circular hole located closely above the mass transfer tray.

By the equipment of the column and the installations as described above, a fountain may be generated. Said fountain may comprise and continuously be supplied by the liquid fraction of the mixture of compounds from the mass transfer tray. First, said liquid fraction of the mixture of compounds enters the rising tube through the at least one lateral opening. Simultaneously, a gas phase of the mixture of compounds enters the same rising tube at the inlet opening and flows, i.e. rises, through the rising tube in direction to the outlet opening of the rising tube. On its way from the inlet opening to the outlet opening, the gas phase of the mixture of compounds and the liquid fraction of the mixture of compounds which enters the rising tube through the at least one lateral opening, are contacted as the lateral opening is located between the inlet opening and the outlet opening. This results in the atomization of the liquid fraction of the mixture of compounds. The atomized liquid fraction of the mixture of compounds passes, i.e. rises, through the rising tube and leaves said rising tube through the outlet opening in the form of a fountain.

The fountain is then sprayed into a part of the column located above the mass transfer tray to a spot of the inner surface of the column where polymerization is likely to occur. There are a number of separation processes which are prone to the occurrence of polymerization, for example if the mixture of compounds to be separated contains compounds that can potentially polymerize. As explained in more detail above, such polymerizations are problematic in many respects, for example due to unwanted consumption of at least a part of one of the compounds, contamination of the mixture of compounds associated with deterioration or complication of the separation process, and, most importantly, formation of harmful side-products that may, for example, be toxic or potentially explosive. As a non-limiting example, the separation of mixtures containing acrylic monomers may be mentioned in this context. For example, polymerization of acrylic acid can produce an undesirable solid side-product which is potentially explosive and tends to adhere to certain points of the column, referred to as "spot of the inner surface of the column where polymerization is likely to occur" in the context of the present application.

Suitably, these spots are also referred to as so-called dead zones. In such "dead zones", the residence time of the fluid in the mass transfer tray is particularly long. Such a long residence time promotes polymerization. Such spots or dead zones of the column may be reached by spraying with the fountain as described in detail above resulting in the generation of liquid circulation by the fountain. The residence time of liquid fraction of the mixture of compounds on the mass transfer tray is reduced as a result.

This is advantageous due to the following reasons: In the event that undesired solid polymerization side-products as described above have already been formed and adhere to spots of the inner surface of the column where polymerization is likely to occur, said adhesions may be removed by continuously spraying with the fountain which may be described as "washing away the adhesions". In the event that the undesired solid polymerization side-products have not or not yet been formed, continuous spraying with the fountain can prevent formation and/or adhesion to spots of the inner surface of the column. Thus, the first inventive column enables reducing the unwanted consumption of acrylic monomers and the contamination of the mixture of compounds resulting in avoiding deterioration or complication of the separation process. Also, the formation of potentially explosive side-products is minimized and thus, the explosion risk during the column operation may be reduced. It is further advantageous that by the design of the first inventive column including the rising tube as described above, the liquid fraction of the mixture of compounds which is utilized for generating the fountain is withdrawn at the same level in the column as it is "sprayed back". Thus, the fountain has the same composition as the mixture of compounds which is present in the region of the spot of the inner surface of the column where polymerization is likely to occur.

Accordingly, the first inventive column provides a rather simple installation that reduces the polymer formation significantly in dead spots of the equipment of the column wherein the purification takes place. Advantageously, a spray to wet the surface of spots is generated where polymer formation is likely. The spray is generated by the rising tube that requires no connection to any installation, e.g. pumps, outside of the appropriate equipment. As driving force for the spray generation, a pressure difference of separation trays may be exploited. In contrast thereto, processes as disclosed in the prior art suitably use spray devices for preventing such unwanted polymerization which can spray liquid against the surface of certain spots in a column cavity. However, such spray devices have the disadvantage that they are accompanied by high investment costs and also cause increased costs for energy and maintenance during regular process mode. Said disadvantages of the prior art processes are overcome by the first inventive column of the present application as it provides a spray which is generated by a rising tube, wherein the rising tube does not require any installation such as pumps. Thus, the first inventive column is a simpler column compared to the columns in the prior art. Further, the first inventive column requires less constructional effort, less maintenance and is less cost sensitive during process mode.

In an embodiment, the ratio of the distance from the center of the lateral opening to the mass transfer tray to the distance from the center of the lateral opening to the outlet opening is in a range of 0.001 to 0.1, preferably 0.005 to 0.01. Said ratio ensures that the at least one lateral opening is located in the lower part of the rising tube. Suitably, this may result in the fountain being constantly fed with liquid fraction of the mixture of compounds from the mass transfer tray flowing through the lateral opening. Thus, it is possible to generate an even more efficient fountain. This results in an even more effective prevention of the formation of undesired polymerization side-products at spots of the inner surface of the column where polymerization is likely to occur, e.g. dead zones, during the thermal treatment of a mixture of compounds.

In an embodiment, the distance from the center of the lateral opening to the mass transfer tray is in a range of 1 to 45 mm, preferably 2 to 10 mm. By means of said distance, it is possible to generate an even more efficient fountain. This results in an even more effective prevention of the formation of undesired polymerization side-products at spots of the inner surface of the column where polymerization is likely to occur, e.g. dead zones, during the thermal treatment of a mixture of compounds.

In an embodiment, the ratio of the inner diameter of the lateral opening to the inner diameter of the rising tube is in a range of 0.01 to 0.8, preferably 0.05 to 0.2. In the event that solely a gas phase of the mixture of compounds, which is essentially free of liquid fraction of the mixture of compounds, enters the rising tube through its inlet opening, the amount of liquid fraction of the mixture of compounds from the mass transfer tray flowing through the lateral opening into the rising tube should be high enough to generate a fountain. By above ratio, the amount of liquid fraction may be controlled resulting in the generation of an even more efficient fountain. This results in an even more effective prevention of the formation of undesired polymerization side-products at spots of the inner surface of the column where polymerization is likely to occur, e.g. dead zones, during the thermal treatment of a mixture of compounds.

In an embodiment, the lateral opening has a diameter in a range of 1 to 10 mm, preferably 3 to 7 mm. By means of said diameter, it is possible to generate an even more efficient fountain. This results in an even more effective prevention of the formation of undesired polymerization side-products at spots of the inner surface of the column where polymerization is likely to occur, e.g. dead zones, during the thermal treatment of a mixture of compounds.

In an embodiment, the rising tube comprises at least one lateral tube which surrounds the lateral opening in a gas-tight manner and protrudes into the rising tube in a radial direction of the rising tube.

In the context of the present application, the term "lateral tube" refers to a hollow tube, designed in such a way that a liquid phase may flow horizontally through said hollow tube into the rising tube. The lateral tube surrounds the lateral opening in a gas-tight manner; for this purpose, the lateral tube may, for example, be welded to the rising tube at the lateral opening. Suitably, the lateral tube may have a circular, square, rectangular, etc. cross section. The lateral tube and the lateral opening have the same cross section geometry, e.g. the lateral opening may be a circular hole and the lateral tube may be a cylindrical tube. Preferably, the diameter of the lateral opening may be in a similar range, or in particular equal, to the inner diameter of the lateral tube. The rising tube may comprise more than one lateral opening and/or lateral tube.

By means of the at least one lateral tube, the liquid fraction of the mixture of compounds may be introduced at a position located further inside the rising tube which may result in the generation of an even more efficient fountain. This results in an even more effective prevention of the formation of undesired polymerization side-products at spots of the inner surface of the column where polymerization is likely to occur, e.g. dead zones, during the thermal treatment of a mixture of compounds.

In an embodiment, the lateral tube protrudes out of the rising tube in a radial direction. For example, solids such as polymerization side-products or sediments of any kind etc. may adhere to the outer surface of the rising tube in the area of the lateral opening or the lateral tube. By designing the lateral tube such that it does not end at the outer surface of the rising tube but protrude out of the rising tube, such solids may not settle around, at or inside the lateral tube. Thus, plugging of the lateral tube may be prevented.

In an embodiment, the lateral tube has a cylindrical or conical shape tapering to the center of the rising tube. By designing the lateral tube in such a way, the position at which the liquid fraction of the mixture of compounds is introduced into the rising tube may be determined even more precisely. This may result in the generation of an even more efficient fountain. This results in an even more effective prevention of the formation of undesired polymerization side-products at spots of the inner surface of the column where polymerization is likely to occur, e.g. dead zones, during the thermal treatment of a mixture of compounds.

In an embodiment, the ratio of the length of the lateral tube to the inner diameter of the rising tube is in a range of 0.5 to 2, preferably 0.5 to 0.8. In the context of the present invention, the length of the lateral tube is referred to as the distance from the part of the lateral tube projecting furthest out of the rising tube to the part of the lateral tube projecting furthest into the rising tube, in each case in a radial direction. By means of said ratio, the position at which the liquid fraction of the mixture of compounds is introduced into the rising tube may even be determined more precisely. This may result in the generation of an even more efficient fountain. This results in an even more effective prevention of the formation of undesired polymerization side-products at spots of the inner surface of the column where polymerization is likely to occur, e.g. dead zones, during the thermal treatment of a mixture of compounds.

In an embodiment, the length of the lateral tube is in a range of 5 to 20 mm, preferably 5 to 10 mm. By means of said length, it is possible to generate an even more efficient fountain. This may result in the generation of an even more efficient fountain. This results in an even more effective prevention of the formation of undesired polymerization side-products at spots of the inner surface of the column where polymerization is likely to occur, e.g. dead zones, during the thermal treatment of a mixture of compounds.

In an embodiment, the lateral tube protruding into the rising tube has a beveled ending, wherein the part of the lateral tube projecting furthest into the rising tube in a radial direction of the rising tube has a smaller vertical distance to the mass transfer tray than the part of the lateral tube projecting the least far into the rising tube in a radial direction of the rising tube.

In the context of the present application, the term "beveled ending" of the lateral tube denotes that the cross section at the end section of the lateral tube does not enclose a right angle with the axis of the lateral tube. In this context, the term "end section of the lateral tube" denotes the ending of the lateral tube, i.e. the part of the lateral tube protruding furthest into the rising tube. In other words, the lateral tube may be cut, e.g. diagonally, at the end protruding into the rising tube. Preferably, it is cut in such a manner that the part of the lateral tube projecting furthest into the rising tube in a radial direction of the rising tube has a smaller distance to the mass transfer tray than the part of the lateral tube projecting the least far into the rising tube.

By designing the lateral tube in a way that it comprises a beveled ending at the end of the lateral tube which protrudes into the rising tube as described above, the position at which the liquid fraction of the mixture of compounds is introduced into the rising tube may be determined even more precisely. This may result in the generation of an even more efficient fountain. This results in an even more effective prevention of the formation of undesired polymerization side-products at spots of the inner surface of the column where polymerization is likely to occur, e.g. dead zones, during the thermal treatment of a mixture of compounds.

According to another aspect of the invention, the above-mentioned problem is solved by a column for a thermal treatment of a mixture of compounds having a tendency to polymerization, wherein the column comprises a cylindrical, vertical column body which forms a column cavity, a mass transfer tray which is disposed in the column cavity and comprises at least one opening which is surrounded by a rim of the mass transfer tray, and at least one lower mass transfer tray, wherein the lower mass transfer tray is located below the mass transfer tray. The column is characterized in that the mass transfer tray comprises at least one rising tube which is connected to the rim of the mass transfer tray in a gas-tight manner and which comprises an inlet opening which is located at or below the mass transfer tray, and an outlet opening which is located above the mass transfer tray. Said rising tube is adapted to form a fountain by atomization of a liquid fraction of the mixture of compounds from the lower mass transfer tray by a rise of a gas phase of the mixture of compounds flowing from the inlet opening through the rising tube to the outlet opening where the fountain is sprayed into a part of the column located above the mass transfer tray, wherein the column cavity is formed so that there is a straight path from the outlet opening of the rising tube to a spot of the inner surface of the column where polymerization is likely to occur for directly spraying of the spot by the fountain.

Said column is referred to as "second inventive column" as described above. Basically, the definitions of the terms of the afore-mentioned first inventive column also apply for the second inventive column.

The second inventive column differs from the first inventive column in the mandatory presence of at least two mass transfer trays which are referred to as "at least one lower mass transfer tray" on the one hand and "the mass transfer tray" or "at least one mass transfer tray" on the other hand. Both mass transfer trays are located in the column cavity and the lower mass transfer tray is located below the mass transfer tray. The at least one rising tube is located on the upper mass transfer tray and a fountain is generated by atomization of a liquid fraction of the mixture of compounds from the lower mass transfer tray. In contrast thereto, in the first inventive column, at least a part of the liquid fraction of the mixture of compounds comes from the upper surface of the mass transfer tray which comprises the rising tube is atomized, wherein said at least part of the liquid fraction may enter the rising tube through the at least one lateral opening.

The column cavity of the second inventive column is formed so that there is a straight path from the outlet opening of the rising tube to a spot of the inner surface of the column where polymerization is likely to occur for directly spraying of the spot by the fountain. The terms "straight path" and "directly spraying" are intended to express that the column cavity does not comprise installations which are installed in the direct pathway from the outlet opening where the fountain leaves the rising tube to the spot of the inner surface of the column where polymerization is likely to occur. This is to ensure that the pathway is free and not blocked by such installations in order to avoid preventing the fountain from reaching said spot or spots.

This is advantageous due to the following reasons: In the event that undesired solid polymerization side-products as described above have already been formed and adhere to spots of the inner surface of the column where polymerization is likely to occur, said adhesions may be removed by continuously and directly spraying with the fountain which may be described as "washing away the adhesions". In the event that the undesired solid polymerization side-products have not or not yet been formed, continuous and direct spraying with the fountain can prevent formation and/or adhesion to spots of the inner surface of the column. Thus, the second inventive column enables reducing the unwanted consumption of acrylic monomers and the contamination of the mixture of compounds resulting in avoiding deterioration or complication of the separation process. Also, the formation of potentially explosive side-products is minimized and thus, the explosion risk during the column operation may be reduced. It is further advantageous that by the design of the second inventive column including the rising tube as described above, the liquid fraction of the mixture of compounds which is utilized for generating the fountain is withdrawn at the same level in the column as it is "sprayed back". Thus, the fountain has the same composition as the mixture of compounds which is present in the region of the spot of the inner surface of the column where polymerization is likely to occur.

In an embodiment, the ratio of the sum of the horizontal cross-sectional areas enclosed by all rising tubes which are located on the same mass transfer tray to the cross-sectional area of the column is in a range of 0.00001 to 0.1, preferably 0.00001 to 0.001. By means of said ratio, it may be ensured that a sufficient amount of liquid fraction of the mixture of compounds is present on the lower mass transfer tray and the fountain in the rising tubes comprised on the mass transfer tray may be sufficiently fed by the liquid fraction. Thus, an efficient fountain, or efficient fountains in the event of more than one rising tubes being present on the mass transfer tray, may be generated. This results in an even more effective prevention of the formation of undesired polymerization side-products at spots of the inner surface of the column where polymerization is likely to occur, e.g. dead zones, during the thermal treatment of a mixture of compounds.

In an embodiment, the rising tube has a diameter in a range of 5 to 50 mm, preferably to 40 mm, more preferably 25 to 35 mm. By means of said diameter, it is possible to generate an even more efficient fountain. This results in an even more effective prevention of the formation of undesired polymerization side-products at spots of the inner surface of the column where polymerization is likely to occur, e.g. dead zones, during the thermal treatment of a mixture of compounds.

In an embodiment, the ratio of the length of the rising tube to the distance between two adjacent mass transfer trays is in a range of 0.1 to 0.9, preferably 0.12 to 0.5. In the context of the present application, the length of the rising tube is defined as the vertical distance between the inlet opening of the rising tube and the outlet opening of the rising tube. By means of said ratio, it is possible to generate an even more efficient fountain. This results in an even more effective prevention of the formation of undesired polymerization side-products at spots of the inner surface of the column where polymerization is likely to occur, e.g. dead zones, during the thermal treatment of a mixture of compounds.

In an embodiment, the rising tube has a length in a range of 50 to 500 mm, preferably 100 to 300 mm. By means of said length, it is possible to generate an even more efficient fountain. This results in an even more effective prevention of the formation of undesired polymerization side-products at spots of the inner surface of the column where polymerization is likely to occur, e.g. dead zones, during the thermal treatment of a mixture of compounds.

In an embodiment, the rising tube comprises an upper kinked part whose axis together with an axis of a lower part of the rising tube forms an angle $\alpha$ in a range of 90° to 170°.

In the context of the present application, the term "kinked part" of the rising tube denotes a rising tube which is not a straight tube but a tube which comprises at least one buckling. Said buckling may be designed such that the part of the rising tube located on the one side of the buckling encloses a sharp angle $\alpha$ in a range of 90° to 170° together with the part of the rising tube located on the opposite side of the buckling. Alternatively, the tube may be bent. In this case, the part of the rising tube located on the one side of the buckling and the part of the rising tube located on the opposite side of the buckling do not enclose a sharp angle but the transition is rather gradual.

By means of said rising tubes having kinked parts, it is possible to direct the fountain leaving the rising tube via the outlet opening to the spot of the inner surface of the column where polymerization is likely to occur in a more efficient way, e.g. in the event that the spot is located in an area of the column which is difficult to access.

This results in an even more effective prevention of the formation of undesired polymerization side-products at spots of the inner surface of the column where polymerization is likely to occur, e.g. dead zones, during the thermal treatment of a mixture of compounds.

In an embodiment, the spot of the inner surface of the column where polymerization is likely to occur is selected from sharp angles of surfaces of support constructions, sharp angles of the bottom of downcomers, manways and/or handholes. Suitably, said spots are also referred to as so-called "dead zones" (see above).

Said spots, e.g. dead zones, in the column cavity are usually difficult to access. By particularly and efficiently spraying said spots, in the event that undesired solid polymerization side-products as described above have already been formed and adhere to said spots, these adhesions may be removed which may be described as "washing away the adhesions". In the event that the undesired solid polymerization side-products have not or not yet been formed, particularly and efficiently spraying said spots can prevent formation and/or adhesion to said spots.

Thus, the unwanted consumption of acrylic monomers and the contamination of the mixture of compounds may be reduced resulting in avoiding deterioration or complication of the separation process. Also, the formation of potentially explosive side-products is minimized and thus, the explosion risk during the column operation may be reduced.

Accordingly, also the second inventive column provides a rather simple installation that reduces the polymer formation significantly in dead spots of the equipment of the column wherein the purification takes place. Advantageously, a spray to wet the surface of spots is generated where polymer formation is likely. The spray is generated by the rising tube that requires no connection to any installation, e.g. pumps, outside of the appropriate equipment. As driving force for the spray generation, a pressure difference of separation trays may be exploited. In contrast thereto, processes as disclosed in the prior art suitably use spray devices for preventing such unwanted polymerization which can spray liquid against the surface of certain spots in a column cavity. However, such spray devices have the disadvantage that they are accompanied by high investment costs and also cause increased costs for energy and maintenance during regular process mode. Said disadvantages of the prior art processes are overcome by the second inventive column of the present application as it provides a spray which is generated by a rising tube, wherein the rising tube does not require any installation such as pumps. Thus, the second inventive column is a simpler column compared to the columns in the prior art. Further, the second inventive column requires less constructional effort, less maintenance and is less cost sensitive during process mode.

The invention further relates to a thermal separating process between at least one gas phase of a mixture of compounds ascending within a column as described above and at least one liquid fraction of the mixture of compounds descending within the column.

In view of the advantages of the columns of the present invention, the inventive thermal separating process which uses the first or second inventive column is a simpler process which causes less maintenance and is less cost sensitive during process mode when compared to the prior art processes.

Basically, the definitions of the terms of the afore-mentioned first inventive column and second inventive column also apply for the thermal separating process.

In an embodiment, a hold-up liquid fraction of the mixture of compounds which is located on the mass transfer tray is atomized forming the fountain at the outlet opening of the rising tube, for directly spraying of the spot of the inner surface of the column where polymerization is likely to occur, by the fountain.

In the context of the present application, the term "hold-up liquid fraction" of the mixture of compounds denotes the quantity of liquid fraction which is located on the mass transfer tray.

By means of directly spraying of the spot of the inner surface of the column where polymerization is likely to occur by the fountain containing atomized hold-up liquid fraction of the mixture of compounds, it is possible to generate said fountain in a simple way which causes only very little maintenance and is not cost sensitive. For example, generating said fountain does not require installation or operation of a pump or comparable devices.

In an embodiment, the level of the hold-up liquid fraction of the mixture of compounds which is located on the mass transfer tray is adjusted such that the center of the lateral opening of the rising tube is at least partially immersed. By means of controlling the level of the hold-up liquid fraction in such a way, it may be ensured that a sufficient amount of liquid fraction of the mixture of compounds is present on the lower mass transfer tray such that a preferably constant flow of the liquid fraction through the lateral opening occurs. Doing so ensures that the fountain may be sufficiently fed by the hold-up liquid fraction and an even more efficient fountain may be generated. This results in an even more effective prevention of the formation of undesired polymerization side-products at spots of the inner surface of the column where polymerization is likely to occur, e.g. dead zones, during the thermal treatment of a mixture of compounds.

In an embodiment, the number of rising tubes and the length and inner diameter of the rising tube or rising tubes is adjusted such that during process mode the pressure drop between the part of the column located below the mass transfer tray and the part of the column located above the mass transfer tray is at least 1 mbar, preferably at least 4 mbar. By means of adjusting the installations of the column in a way such that a pressure drop as mentioned above sets, it is possible to generate an even more efficient fountain, e.g. regarding spraying power. This results in an even more effective prevention of the formation of undesired polymerization side-products at spots of the inner surface of the column where polymerization is likely to occur, e.g. dead zones, during the thermal treatment of a mixture of compounds.

In an embodiment, the ascending gas phase and/or the descending liquid fraction comprises (meth)acrylic monomers.

The thermal separating process according to the invention may, for example, be a process for fractional condensation for separation of acrylic acid from a product gas mixture comprising acrylic acid from a heterogeneously catalyzed gas phase oxidation of a $C_3$ precursor compound, especially propene and/or propane, of the acrylic acid with molecular oxygen to give acrylic acid.

In such a thermal separating process, the tendency to polymerization is particularly great because of the use of (meth)acrylic monomers. Such unwanted polymerization is prevented in the process according to the invention by virtue of the fountain comprising atomized liquid fraction of the mixture of compounds containing (meth)acrylic monomers. Said fountain is sprayed into a spot of the inner surface of the column where polymerization is likely to occur.

By means of said spraying of spots in the column, e.g. dead zones, the formation of undesired polymerization side-products during the thermal treatment process may be prevented.

BRIEF DESCRIPTION OF FIGURES

The present invention is described in detail below with reference to the attached FIGS. and working examples.

EXAMPLES

The working example described hereinafter relates to a column 1 as used, for example, in a process for thermal treatment, e.g. by fractional condensation, for separation of acrylic acid from a gas phase, which is also referred to as "product gas phase", comprising acrylic acid from a heterogeneously catalyzed gas phase partial oxidation of a $C_3$ precursor compound, especially propene and/or propane, of the acrylic acid with molecular oxygen to give acrylic acid.

Figure 1:
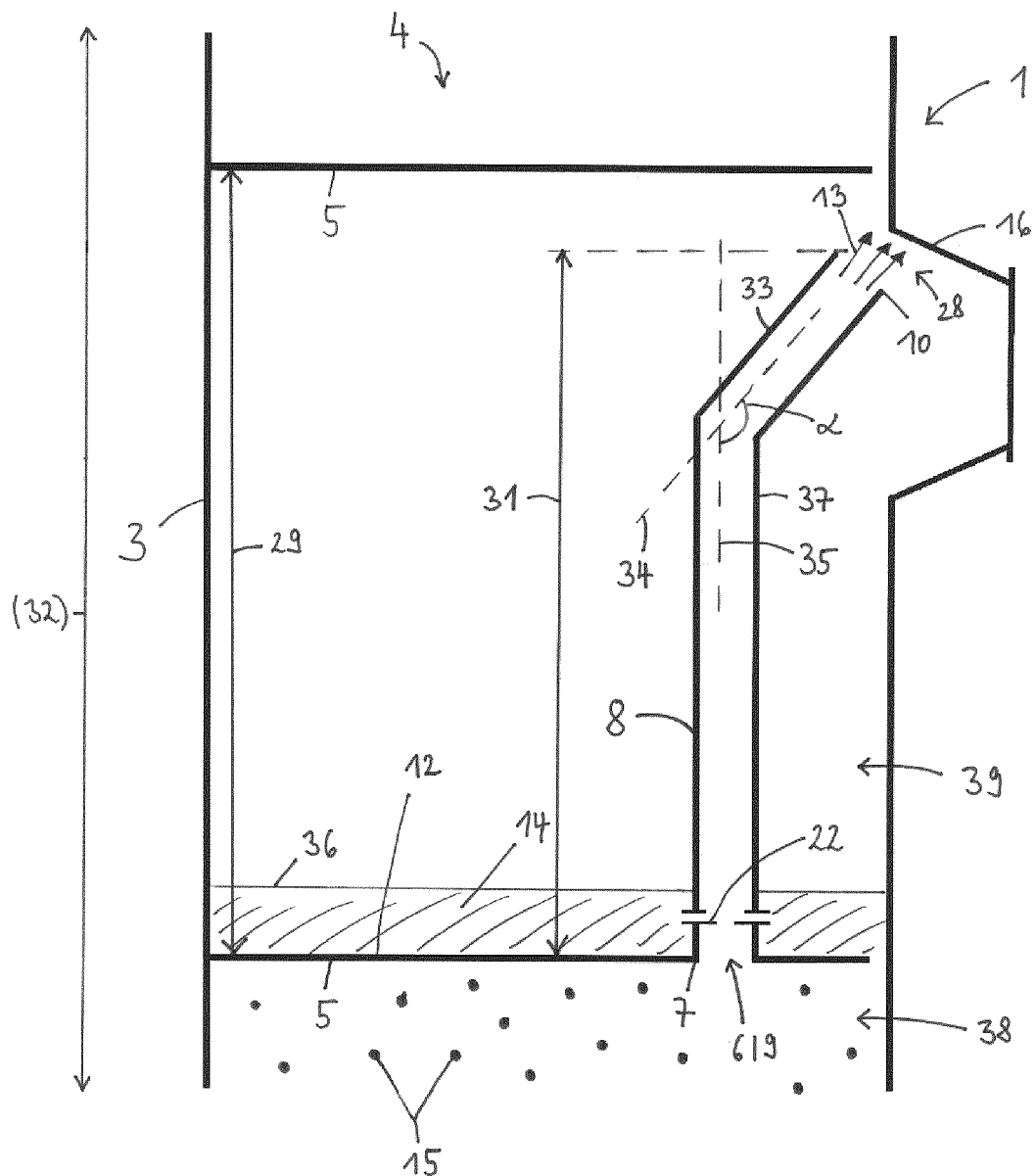
FIG. 1 shows a schematic vertical section of a part of a column in a working example of the present invention.

FIG. 1 depicts a schematic vertical section of a part of the column 1. Said column 1 comprises a cylindrical, vertical column body 3, wherein the term "vertical" means in this context that the axis of column 1 is aligned vertically. Essentially, the column 1 is a hollow cylinder. This means that the shell of the column 1 encloses a column cavity 4. The column 1 is manufactured from stainless steel. Normally, the column 1 is thermally insulated on its outside in a conventional manner. The column 1 has a length 32, i.e. a height, of 61 m. The column 1 has a diameter of 7.4 m and thus a cross-sectional area of 43 m².

Several mass transfer trays 5 are secured in the column cavity 4 in a horizontal fashion and are mounted with vertical spacing, wherein the distance 29 between two adjacent mass transfer trays 5 is 600 mm in the context of the working example of FIG. 1. The mass transfer trays 5 serve as separating internals which improve separation in the column 1 during a thermal separating process. The partial view shown in FIG. 1 shows two of the mass transfer trays 5. In this case, the mass transfer tray 5 is a Thormann tray having an upper surface 12 of the mass transfer tray 5 which is generally also referred to as "collecting area".

One opening 6 is inserted into the mass transfer tray 5 in the form of a circular hole which is cut out of the mass transfer tray 5. Said opening 6 has a diameter of 33.7 mm and thus, the circumference of the opening 6, or the rim 7 of the mass transfer tray 5 that defines the opening 6, measures 106 mm.

The mass transfer tray 5 comprises a number of rising tubes 8. In the embodiment described herein, one rising tube 8 is inserted in mass transfer tray 5. The rising tube 8 is a cylindrical tube made from stainless steel and is welded to the opening 6 of the mass transfer tray 5 in a gas-tight and also in a fluid-tight manner. The rising tube 8 comprises an inlet opening 9 which is the bottom part of the rising tube 8 welded to the rim 7 of the mass transfer tray 5. Further, the rising tube 8 comprises an outlet opening 10 which is the upper part of the rising tube 8. In other words, the outlet opening 10 is located at the opposite side of the inlet opening 9 of the rising tube 8.

In the working example of FIG. 1, the rising tube 8 is located between two adjacent mass transfer trays 5, wherein the distance 29 between the two adjacent mass transfer trays 5 is about 600 mm. The length 31 of the rising tube 8 is defined as the vertical distance between the inlet opening 9 of the rising tube 8 and the outlet opening 10 of the rising tube 8. In the context of the working example of FIG. 1, the length 31 of the rising tube 8 is about 200 mm. Thus, the ratio of the length 31 of the rising tube 8 to the distance 29 between two adjacent mass transfer trays 5 is then 0.33.

In the case of FIG. 1, where the number of rising tubes 8 is one, the sum of the horizontal cross-sectional areas enclosed by all rising tubes 8, which are located on the same mass transfer tray 5, equals the horizontal cross-sectional area of the only present rising tube 8 which is 33895 mm$^2$. As the column 1 has a diameter of 7.4 m and thus a cross-sectional area of 43 m$^2$, the ratio of the sum of the horizontal cross-sectional areas enclosed by all rising tubes 8 which are located on the same mass transfer tray 5 to the cross-sectional area of the column 1 is 0.00079 in the context of FIG. 1.

The column 1 in FIG. 1 comprises a liquid fraction 14 and a gas phase 15 comprising acrylic acid that is a mixture of compounds having a tendency to polymerization. Said mixture of compounds is thermally treated in a thermal treatment process in the column cavity 4. At least part of the liquid fraction 14 is located on the upper surface 12 of the mass transfer tray 5 providing a level 36 of the liquid fraction 14. The gas phase 15 may be present in the column cavity 4 either below or above the mass transfer tray 5. The part of the column 1 located below the mass transfer tray 5 is designated by reference numeral 38; the part of the column 1 located above the mass transfer tray 5 is designated by reference numeral 39.

Figure 2:
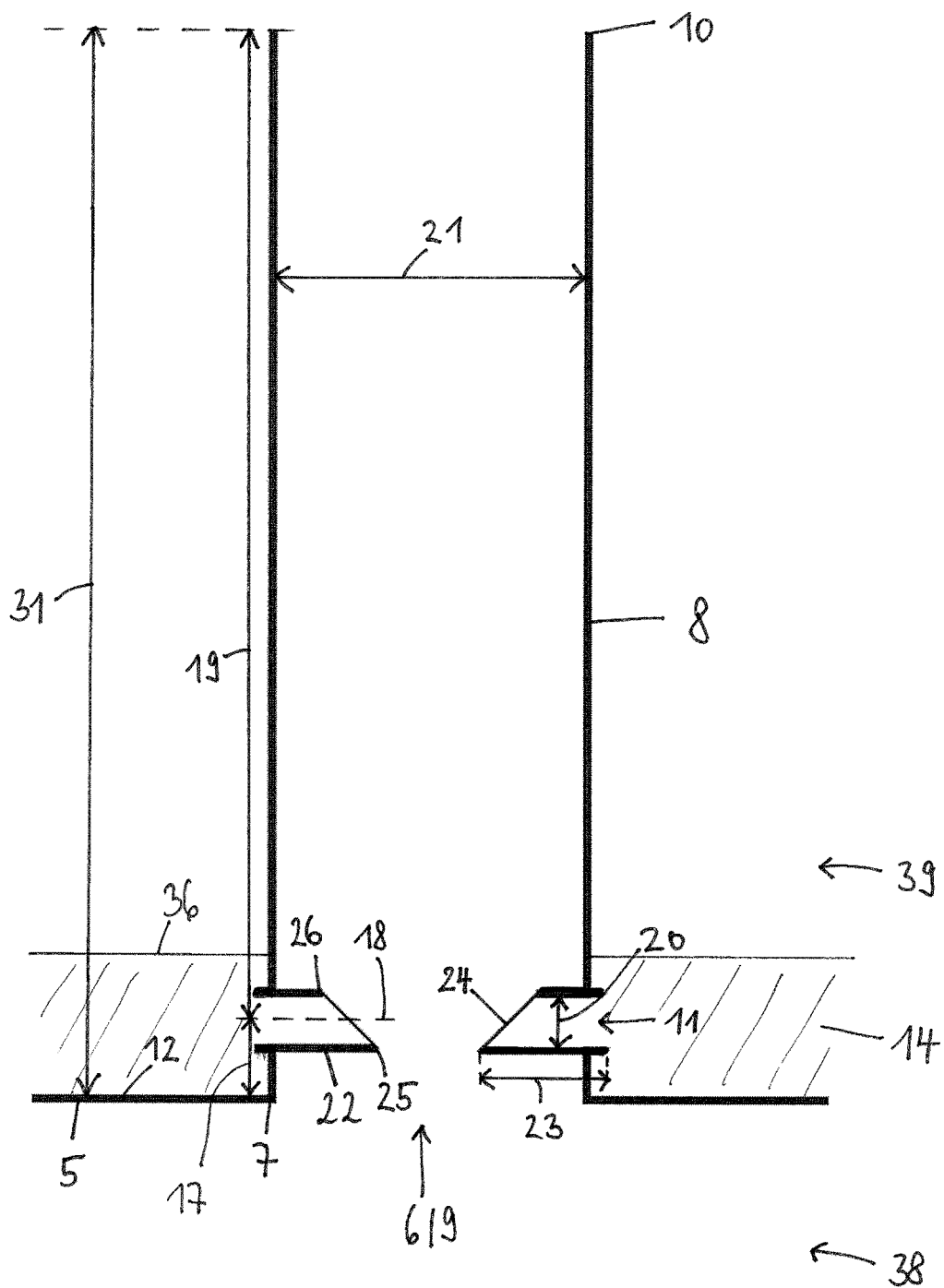
FIG. 2 shows a schematic vertical section of a rising tube which may be used in a working example of the present invention.

FIG. 2 depicts an enlarged view of a schematic vertical section of a part of the rising tube 8 which is connected to mass the transfer tray 5 for use in a working example of the present invention. Identical reference signs as in FIG. 1 are used for corresponding components in FIG. 2.

The rising tube 8 comprises two lateral openings 11 being opposite to each other in order to enable that the liquid fraction 14 may flow into the rising tube 8. The lateral openings 11 are inserted into the rising tube 8 in the form of circular holes having a center 18. The circular holes are drilled into the rising tube 8.

The distance 17 from the center 18 of the lateral openings 11 to the mass transfer tray 5 is smaller than the distance from the level 36 of the hold-up liquid fraction 14 of the mixture of compounds to the mass transfer tray 5. This feature as well as further process features such as the number of rising tubes 8 as well as the length 31 and inner diameter 21 of the rising tube 8 or rising tubes 8 and/or the temperature and/or the pressure are adjusted in a way that the level 36 of the hold-up liquid fraction 14 of the mixture of compounds which is located on the mass transfer tray 5 is adjusted such that the center 18 of the lateral opening 11 of the rising tube 8 is at least partially immersed. This ensures that the liquid fraction 14 of the mixture of compounds can flow into the rising tube 8 through the lateral openings 11. In the working example of FIG. 1, the distance 17 is 5 mm and the level 36 of the hold-up liquid fraction 14 is located 35 mm above the upper surface 12 of the mass transfer tray 5.

The rising tube 8 in FIGS. 1 and 2 further comprises two lateral tubes 22, which each surround the lateral openings 11 and protrude both into and out of the rising tube 8 in a radial direction of the rising tube 8. The lateral tubes 22 are cylindrical tubes made from stainless steel and are welded to the rising tube 8 in a gas-tight and also in a fluid-tight manner. The lateral tubes 22 have an inner diameter of 4 mm and a length 23 of 10 mm (see FIG. 2). The rising tube 8 has an inner diameter 21 of 29.7 mm and a length 31 of about 200 mm. Thus, the ratio of the length 23 of the lateral tube 22 to the inner diameter 21 of the rising tube 8 is 0.34; and the ratio of the inner diameter of the lateral tube 22 to the inner diameter 21 of the rising tube 8 is 0.135.

By means of the rising tube 8, a part of the liquid fraction 14 of the mixture of compounds, which is located on the upper surface 12 of the mass transfer tray 5, enters the rising tube 8 through the lateral openings 11 by flowing through the lateral tubes 22. Inside the rising tube 8, the liquid fraction 14 of the mixture of compounds is atomized by contacting with the gas phase 15 which is rising from the part 38 of the column 1 located below the mass transfer tray 5. Said gas phase 15 flows from the inlet opening 9 through the rising tube 8 to the outlet opening 10, thereby entraining the part of the liquid fraction 14 which entered the rising tube 8. Thus, at the outlet opening 10 of the rising tube 8, a fountain 13 is formed (see FIG. 1). By means of said fountain 13, a spot 16 of the inner surface of the column 1 where polymerization is likely to occur can be sprayed. In FIG. 1, said spot 16 is an inner surface of a manway. At such manways, it is common that undesired side-products from polymerized acrylic acid form and stick to the surface of the manways. For being able to spray such spots 16 with the fountain 13, there are no installations in the column cavity 4 which are in the way of the fountain 13 from the outlet opening 10 to the spot 16. In other words, there is a straight path 28 from the outlet opening 10 of the rising tube 8 to the spot 16 of the inner surface of the column 1 where polymerization is likely to occur.

In FIG. 1, the spot 16 of the inner surface of the column 1 where polymerization is likely to occur, namely at the inner surface of the manway, is not located directly above the opening 6 of the mass transfer tray 5, but rather laterally offset and provided in the cylindrical, vertical column body 3. Therefore, in order to be able to reach the spot 16 with the fountain 13, the rising tube 8 of the present embodiment comprises a lower part 37 which is oriented vertically and an upper kinked part 33 so that the outlet opening 10 points towards spot 16. The straight path 28 from the outlet opening 10 of the rising tube 8 to the spot 16 of the inner surface of the column 1 where polymerization is likely to occur is an extension of the axis 34 of said kinked part 33. The angle α between the axis of the lower part 37 of the rising tube 8 and the axis 34 of the kinked part 33 is 140°. In the event that the rising tube 8 does not comprise a kinked part 33 (see FIG. 2), the length 31 of the rising tube 8 is the sum of the distance 17 from the center 18 of the lateral opening 11 to the mass transfer tray 5 and the distance 19 from the center 18 of the lateral opening 11 to the outlet opening 10. In the event that the rising tube 8 comprises a kinked part 33 (see FIG. 1), the length 31 of the rising tube 8 is the vertical distance between the upper surface 12 of the mass transfer tray 5 and the outlet opening of the rising tube 8.

As can be seen in FIG. 1 and in more detail in FIG. 2, the parts of the lateral tubes 22 protruding into the rising tube 8 have beveled endings 24. This means that the cross sections at the endings of end sections of the lateral tubes 22 do not enclose a right angle with the axis of the lateral tubes 22. In other words, the lateral tubes 22 may be cut, e.g. diagonally, at the end protruding into the rising tube 8. In FIG. 2, the beveled endings 24 are cut in an angle of 45°.

In FIG. 2, the parts 25 of the lateral tubes 22 projecting furthest into the rising tube 8 in a radial direction of the rising tube 8 are located at the bottom part of the lateral tubes 22. Contrarily, the parts 26 of the lateral tubes 22 projecting the least far into the rising tube 8 in a radial direction of the rising tube 8 are located at the top part of the lateral tubes 22. Thus, the vertical distances of the parts 25 to the mass transfer tray 5 are smaller than the vertical distances of the parts 26 to the mass transfer tray 5. The installation of beveled endings 24 ensures that the liquid fraction 14 is contacted more efficiently with the rising gas phase 15 as it is injected into the gas stream of gas phase 15.

The column 1 and process features such as the number of rising tubes 8 and the length 31 and inner diameter 21 of the rising tube 8 or rising tubes 8 and/or the temperature and/or the pressure are adjusted such that during process mode, the pressure drop between the part of the column 1 located below 38 the mass transfer tray 5 and the part of the column 1 located above 39 the mass transfer tray 5 is 2 mbar to 4 mbar.

Figure 3:
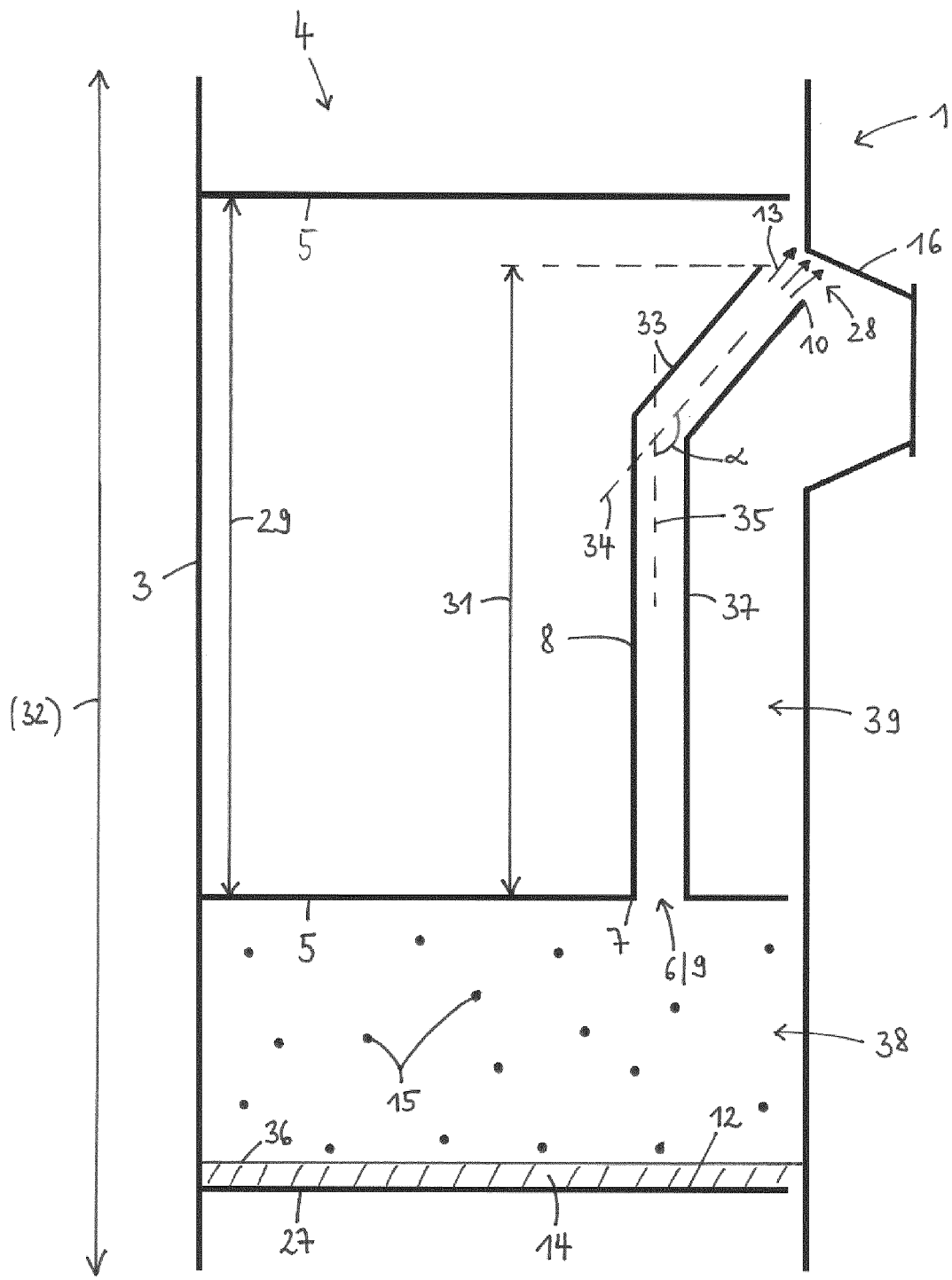
FIG. 3 shows a schematic vertical section of a part of a column in a further working example of the present invention.

A further working example is shown in FIG. 3. Basically, a similar column 1 as already depicted in FIG. 1 is shown. Identical reference signs as in FIGS. 1 and 2 are used for corresponding components of column 1 in FIG. 3.

In comparison to the column 1 in FIG. 1, the rising tube 8 in column 1 in FIG. 3 does not comprise lateral tubes 22. An additional feature of column 1 in FIG. 3 as compared to column 1 in FIG. 1 is the presence of a further lower mass transfer tray 27 besides the mass transfer tray 5. The further lower mass transfer tray 27 is located below the mass transfer tray 5. The schematic vertical section of column 1 in FIG. 3 shows a total number of three trays, i.e. two mass transfer trays 5 and one further lower mass transfer tray 27. By means of the presence of the further lower mass transfer tray 27, in the process of the working example of FIG. 3, the liquid fraction 14 of the mixture of compounds rises, together with the gas phase 15 of the mixture of compounds, from the further lower mass transfer tray 27 instead of the mass transfer tray 5. In comparison thereto, in column 1 of FIG. 1, the liquid fraction 14 of the mixture of compounds enters the rising tube 8 via the lateral tubes 22.

It is pointed out that it is also possible to use other mass transfer trays among those mentioned by way of introduction in all the working examples.

In the following, a working example of the process according to the invention is described which is executed with the above-described column 1 of one of the working examples.

The process is a thermal separating process between at least one gas phase 15 of the mixture of compounds ascending in column 1 and at least one liquid fraction 14 of the mixture of compounds descending in column 1. The ascending gas phase 15 and/or the descending liquid fraction 14 especially comprises (meth)acrylic monomers.

In said thermal separating process, a fractional condensation for separation of acrylic acid from a product gas phase comprising acrylic acid from a heterogeneously catalyzed gas phase partial oxidation of a $C_3$ precursor compound, especially propane and/or propene, with molecular oxygen to give acrylic acid is conducted in a column 1 comprising separating internals. The column 1 comprises, from the bottom upward, a plurality of mass transfer trays 5. Otherwise, the process is conducted as described in documents DE 19924532 A1, DE 10243625 A1 and WO 2008/090190 A1. In this case, however, the liquid fraction 14 of the mixture of compounds which is located on a mass transfer tray 5 or on the further lower mass transfer tray 27 is atomized using a rising tube 8 and the ascending gas phase 15 as described in further detail above for obtaining a fountain 13 which is sprayed into a part of the column 1 located above 39 the mass transfer tray 5 to a spot 16 of the inner surface of the column 1 where polymerization is likely to occur.

The term "$C_3$ precursor" of acrylic acid encompasses those chemical compounds which are obtainable in a formal sense by reduction of acrylic acid. Known $C_3$ precursors of acrylic acid are, for example, propane, propene and acrolein. However, compounds such as glycerol, propionaldehyde, propionic acid or 3-hydroxypropionic acid should also be counted among these $C_3$ precursors. Proceeding from these, the heterogeneously catalyzed gas phase partial oxidation with molecular oxygen is at least partly an oxidative dehydrogenation. In the relevant heterogeneously catalyzed gas phase partial oxidations, the $C_3$ precursors of acrylic acid mentioned, generally diluted with inert gases, for example molecular nitrogen, CO, $CO_2$, inert hydrocarbons and/or steam, are passed in a mixture with molecular oxygen at elevated temperatures and optionally elevated pressure over transition metal mixed oxide catalysts, and converted oxidatively to a product gas phase comprising acrylic acid.

Typically, the product gas phase comprising acrylic acid from a heterogeneously catalyzed gas phase partial oxidation of $C_3$ precursors, e.g. propene, with molecular oxygen over solid state catalysts, based on the total amount of the specified constituents present therein, has the following contents:

| | |
|---|---|
| 1 to 30 wt.-% of | acrylic acid, |
| 0.05 to 10 wt.-% of | molecular oxygen, |
| 1 to 30 wt.-% of | water, |
| 0 to 5 wt.-% of | acetic acid, |
| 0 to 3 wt.-% of | propionic acid, |
| 0 to 1 wt.-% of | maleic acid and/or maleic anhydride, |
| 0 to 2 wt.-% of | acrolein, |
| 0 to 1 wt.-% of | formaldehyde, |
| 0 to 1 wt.-% of | furfural, |
| 0 to 0.5 wt.-% of | benzaldehyde, |
| 0 to 1 wt.-% of | propene, and |
| as the remainder | inert gases, for example Ar, $N_2$ or $CO_2$. |

The partial gas phase oxidation itself can be performed as described in the prior art. Proceeding from propene, the partial gas phase oxidation can be performed, for example, in two successive oxidation stages, as described, for example, in EP 700 714 A1 and in EP 700 893 A1. It will be appreciated, however, that it is also possible to employ the partial gas phase oxidations cited in DE 19740253 A1 and in DE 19740252 A1.

In general, the temperature of the product gas phase leaving the partial gas phase oxidation is from about 150 to about 350° C., preferably from about 200 to about 300° C.

Direct cooling and/or indirect cooling cools the hot product gas phase appropriately at first to a temperature in a range from about 100 to about 180° C., before it is conducted into the bottom part of column 1 for performing the thermal treatment process, e.g. fractional condensation, of said product gas phase. The operating pressure in column 1 is generally 0.5 to 5 bar, preferably 0.5 to 3 bar and in many cases 1 to 2 bar.

LIST OF REFERENCE SIGNS 1 column
3 cylindrical, vertical column body
4 column cavity
5 mass transfer tray
6 opening
7 rim
8 rising tube
9 inlet opening
10 outlet opening
11 lateral opening
12 upper surface
13 fountain
14 liquid fraction
15 gas phase
16 spot of the inner surface of the column where polymerization is likely to occur
17 distance
18 center
19 distance
20 inner diameter
21 inner diameter
22 lateral tube
23 length
24 beveled ending
25 part projecting furthest
26 part projecting the least far
27 further lower mass transfer tray
28 straight path
29 distance
31 length
32 length
33 kinked part
34 axis
35 axis
36 level
37 lower part of rising tube
38 part of the column located below
39 part of the column located above
α angle

The invention claimed is:

1. A column for a thermal treatment of a mixture of compounds having a tendency to polymerization, wherein the column comprises
a cylindrical, vertical column body which forms a column cavity,
at least one mass transfer tray which is disposed in the column cavity and comprises passage orifices, and at least one opening which is surrounded by a rim of the mass transfer tray,
wherein
the mass transfer tray comprises at least one rising tube which is connected to the rim of the mass transfer tray in a gas-tight manner and which comprises an inlet opening which is located at or below the at least one mass transfer tray, and
an outlet opening which is located above the at least one mass transfer tray, and
at least one lateral opening which is located above the mass transfer tray in a vertical direction close to an upper surface of the mass transfer tray, said rising tube is adapted to form a fountain by atomization of a liquid fraction of the mixture of compounds from the mass transfer tray that enters through at least one lateral opening into the rising tube by a rise of a gas phase of the mixture of compounds flowing from the inlet opening through the rising tube to the outlet opening where the fountain is sprayed into a part of the column located above the mass transfer tray to a spot of the inner surface of the column where polymerization is likely to occur, wherein a pressure difference of trays is exploited as driving force for the spray generation.

2. The column according to claim 1, wherein the ratio of the distance from the center of the lateral opening to the mass transfer tray to the distance from the center of the lateral opening to the outlet opening is in a range of 0.001 to 0.1.

3. The column according to claim 1, wherein the distance from the center of the lateral opening to the mass transfer tray is in a range of 1 to 45 mm.

4. The column according to claim 1, wherein the ratio of the inner diameter of the lateral opening to the inner diameter of the rising tube is in a range of 0.01 to 0.8.

5. The column according to claim 1, wherein the rising tube comprises at least one lateral tube which surrounds the lateral opening in a gas-tight manner and protrudes into the rising tube in a radial direction of the rising tube.

6. The column according to claim 1, wherein the lateral tube has a cylindrical or conical shape tapering to the center of the rising tube.

7. The column according to claim 1, wherein the lateral tube protruding into the rising tube has a beveled ending, wherein the part of the lateral tube projecting furthest into the rising tube in a radial direction of the rising tube has a smaller vertical distance to the mass transfer tray than the part of the lateral tube projecting the least far into the rising tube in a radial direction of the rising tube.

8. The column according to claim 1, wherein the ratio of the sum of the horizontal cross-sectional areas enclosed by all rising tubes which are located on the same mass transfer tray to the cross-sectional area of the column is in a range of 0.00001 to 0.1.

9. The column according to claim 1, wherein the rising tube comprises an upper kinked part whose axis together with an axis of a lower part of the rising tube forms an angle (a) in a range of 90° to 170°.

10. The column according to claim 1, wherein the spot of the inner surface of the column where polymerization is likely to occur is selected from sharp angles of surfaces of support constructions, sharp angles of the bottom of downcomers, manways and/or handholes.

11. A thermal separating process between at least one gas phase of a mixture of compounds ascending within a column according to claim 1 and at least one liquid fraction of the mixture of compounds descending within the column (1).

12. The process according to claim 11, wherein a hold-up liquid fraction of the mixture of compounds which is located on the mass transfer tray is atomized forming the fountain at the outlet opening of the rising tube, for directly spraying of the spot of the inner surface of the column where polymerization is likely to occur, by the fountain.

13. The process according to claim 11, wherein the level f the hold-up liquid fraction of the mixture of compounds which is located on the mass transfer tray is adjusted such that the center of the lateral opening of the rising tube is at least partially immersed.

14. The process according to claim 11, wherein the number of rising tubes and the length and inner diameter of the rising tube or rising tubes is adjusted such that during process mode the pressure drop between the part of the column located below the mass transfer tray and the part of the column located above the mass transfer tray is at least 1 mbar.

15. A column for a thermal treatment of a mixture of compounds having a tendency to polymerization, wherein the column comprises
- a cylindrical, vertical column body which forms a column cavity,
- a mass transfer tray which is disposed in the column cavity and comprises passage orifices, and
- at least one opening which is surrounded by a rim of the mass transfer tray,
- at least one further lower mass transfer tray, wherein the further lower mass transfer tray is located below the mass transfer tray, wherein the mass transfer tray comprises at least one rising tube which is connected to the rim of
the mass transfer tray in a gas-tight manner and which comprises
an inlet opening which is located at or below the mass transfer tray, and
an outlet opening which is located above the mass transfer tray,
said rising tube is adapted to form a fountain atomization of a liquid fraction of the mixture of compounds from the further lower mass transfer tray by a rise of a gas phase of the mixture of compounds flowing from the inlet opening through the rising tube to the outlet opening where the fountain is sprayed into a part of the column located above the mass transfer tray, wherein a pressure difference of trays is exploited as driving force for the spray generation, and wherein
the column cavity is formed so that there is a straight path from the outlet opening of the rising tube to a spot of the inner surface of the column where polymerization is likely to occur for directly spraying of the spot by the fountain.

\* \* \* \* \*